United States Patent [19]

Eling et al.

[11] Patent Number: 5,773,483
[45] Date of Patent: Jun. 30, 1998

[54] PROCESS FOR PREPARING A FLEXIBLE FOAM

[75] Inventors: Berend Eling, Bertem; Eric Huygens, Heverlee, both of Belgium

[73] Assignee: Imperial Chemical Industries PLC, London, England

[21] Appl. No.: 551,690

[22] Filed: Nov. 1, 1995

Related U.S. Application Data

[63] Continuation of Ser. No. 223,805, Apr. 6, 1994, abandoned, which is a continuation-in-part of Ser. No. 83,828, Jun. 25, 1993, abandoned.

[30] Foreign Application Priority Data

| Apr. 13, 1993 | [GB] | United Kingdom | 9307556 |
| Jan. 25, 1994 | [GB] | United Kingdom | 9401339 |

[51] Int. Cl.$^6$ ............................. C08J 9/08; C08G 18/22
[52] U.S. Cl. ............... 521/125; 521/114; 521/116; 521/117; 521/130; 521/159; 521/160; 521/174
[58] Field of Search .................. 521/116, 117, 521/125, 130, 174, 160, 159

[56] References Cited

U.S. PATENT DOCUMENTS

| 3,940,517 | 2/1976 | DeLeon | 427/373 |
| 4,098,732 | 7/1978 | Yukuta et al. | 521/125 |
| 4,365,025 | 12/1982 | Murch et al. | 521/159 |
| 4,393,015 | 7/1983 | Kaneda et al. | 264/51 |
| 4,797,464 | 1/1989 | Nodelman | 28/110 |
| 5,063,253 | 11/1991 | Gansen et al. | 521/159 |
| 5,114,989 | 5/1992 | Elwell et al. | 521/159 |

FOREIGN PATENT DOCUMENTS

| 0022617 | 1/1981 | European Pat. Off. . |
| 0220697 | 5/1987 | European Pat. Off. . |
| 220697 | 6/1987 | European Pat. Off. . |
| 294161 | 7/1988 | European Pat. Off. . |
| 0294161 | 12/1988 | European Pat. Off. . |
| 0398304 | 11/1990 | European Pat. Off. . |
| 0485953 | 5/1992 | European Pat. Off. . |
| 0491439 | 6/1992 | European Pat. Off. . |
| 60-139791 | 7/1985 | Japan . |
| 2025439 | 1/1980 | United Kingdom . |
| 2064567 | 6/1981 | United Kingdom . |

*Primary Examiner*—Rabon Sergent

[57] ABSTRACT

A method for the preparation of flexible polyurethane foams by reacting a polyisocyanate containing at least 85% by weight of 4,4'-diphenylmethane diisocyanate or a liquid variant thereof with a polyol composition comprising at least one poly(oxyethylene-oxyalkylene) polyol having an average nominal hydroxyl functionality of from 2 to 6, a number average hydroxyl equivalent weight of from 1000 to 3000, and an average oxyethylene content of from 50 to 85% by weight and with water in the presence of a catalytically effective amount of an alkali or alkaline earth metal carboxylate salt.

6 Claims, No Drawings

PROCESS FOR PREPARING A FLEXIBLE FOAM

CROSS REFERENCE TO RELATED APPLICATIONS

This application is a continuation application of co-pending U.S. patent application Ser. No. 08/223,805, filed Apr. 6, 1994, entitled "Process for Preparing a Flexible Foam", now abandoned which in turn is a continuation-in-part application of U.S. patent application Ser. No. 08/083,828 filed Jun. 25, 1993 entitled "Process For Preparing a Flexible Foam" now abandoned.

The manufacture of polyurethane flexible foams by reacting organic polyisocyanates such as tolylene diisocyanate (TDI) or diphenylmethane diisocyanate (MDI) with polyether polyols in conjunction with a foaming agent is well established. The polyethers are usually polyoxypropylene polyols derived from propylene oxide or poly (oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates.

Polyols having higher oxyethylene contents, for example 50% or more on a weight basis, are often employed as minor additives to ensure that the foams have an open-cell structure. The use of these polyethers at very high concentrations in conjunction with the usual isocyanates is not possible because then, instead of having a cell-opening effect, they result in closed cell foam.

In co-pending EP application 92310471.5 it has been found that flexible foam having valuable properties can be successfully made from formulations containing high concentrations of polyols having high oxyethylene contents if substantially pure 4,4'-MDI or a derivative thereof is employed as the polyisocyanate.

It has now been found that such foams advantageously can be made using a special class of catalysts. By using this special class of catalysts instead of conventional amine-containing catalysts the foams show a reduced chance of discoloration e.g. due to side reactions with additives like antioxidants compared to foams comprising tertiary amine catalysts, give less rise to unpleasant smell, are easier recyclable and give less rise to the occurrence of fogging.

Thus according to the invention, there is provided a method for the preparation of flexible polyurethane foams by reacting a polyisocyanate containing at least 85%, preferably at least 90% and more preferably at least 95% by weight of 4,4'-diphenylmethane diisocyanate or a liquid variant thereof with a polyol composition comprising at least one poly (oxyethylene-oxyalkylene) polyol having an average nominal hydroxyl functionality of from 2 to 6, a number average hydroxyl equivalent weight of from 1000 to 3000 and an average oxyethylene content of from 50 to 85, preferably 60 to 85% by weight, preferably the oxyethylene content of any further optionally present polyol having a number average hydroxyl equivalent weight of 1000 to 3000 being at least 50% by weight and with water in the presence of a catalytically effective amount of an alkali metal alkaline earth metal carboxylate salt.

The catalyst may be a salt of any metal of Groups IA and IIA of the Periodic Table but in general the alkali metal salts are preferred like potassium and sodium salts, especially the potassium salts. If desired mixtures of such salts may be used like a mixture of a potassium and a sodium salt.

A catalytically effective amount of the salt will usually be in the range of 0.1 to 5, preferably 0.2–3 parts by weight per 100 parts by weight of reactants.

Although other polyurethane catalysts may be used together with the above catalysts, like the generally known tertiary amine catalysts and tin catalysts, it is preferred that the foams are made in the absence of other catalysts in particular in the absence of tertiary amine and tin catalysts.

The carboxylate may be selected from aliphatic carboxylates having 2–10 carbon atoms like acetate, hexanoate, 2-ethylhexanoate and octanoate.

Especially the carboxylate may be selected from those having the formula R-E-A-COO⁻ wherein A is a hydrocarbon diradical having 1–6 preferably 1–3 carbon atoms;

E is —O— or

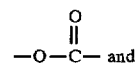

R is X—$R_1$—$(OR_2)_n$— wherein X is $CH_3$— or OH—, $R_1$ is a hydrocarbon diradical having 1–8 and preferably 1–4 carbon atoms, $R_2$ is a hydrocarbon diradical having 2–4 and preferably 2 or 3 carbon atoms and n is 0 to 10, preferably 0–5.

Some of such catalysts and their preparation are known as such, see EP 294161 and EP 220697.

A may be selected from diradicals like —$CH_2$—, —$CH^2CH_2$— —$CH_2CH_2CH_2$—, —CH=CH—$CH_2$—,

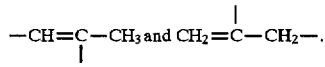

The most preferred diradical is —CH=CH— or

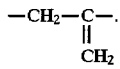

$R_1$ may be selected from those diradicals mentioned for A and from radicals obtained by removing two hydrogen atoms from e.g. butane, pentane, hexane and octane. The most preferred radicals for $R_1$ are methylene, ethylene, trimethylene, tetramethylene and propylene.

$R_2$ may be selected from ethylene, trimethylene, tetramethylene, ethylethylene and propylene. Most preferred groups are ethylene and propylene.

Examples of catalysts are sodium acetate, potassium acetate, potassium hexanoate, potassium 2-ethylhexanoate, potassium ethoxyacetate, sodium ethoxyacetate, the potassium salt of the hemi-ester of maleic acid and ethoxyethane, ethoxyethoxyethane, ethylene glycol, diethylene glycol, triethylene glycol, tetraethylene glycol, propylene glycol, dipropylene glycol, tripropylene glycol, methanol, ethanol, propanol or butanol and the potassium salt of the hemi-ester of such hydroxy containing compounds with malonic, succinic, glutaric, adipic or fumaric acid. Mixtures of these catalysts may be used as well.

The polyisocyanate component used in the method of the invention may consist essentially of pure 4,4'-diphenylmethane diisocyanate or mixtures of that diisocyanate with one or more other organic polyisocyanates, especially other diphenylmethane diisocyanate isomers, for example the 2,41-isomer optionally in conjunction with the 2,2'-isomer. The polyisocyanate component may also be an MDI variant derived from a polyisocyanate composition containing at least 85% by weight of 4,4'-diphenylmethane diisocyanate. MDI variants are well known in the art and, for use in accordance with the invention, particularly include liquid (at ambient temperature) products obtained by introducing uretonimine and/or carbodiimide groups into said polyisocyanate composition (e.g. containing up to 30% by weight of uretonimine- and/or carbodiimide-modified 4,4'-MDI) and/or by reacting such a composition with one or more polyols.

The polyol composition may comprise a single polyoxyalkylene polyol, preferably a poly(oxyethylene-oxypropylene) polyol, having the required functionality, equivalent weight and oxyethylene content. Such polyols are known in the art and may be obtained in conventional manner by reacting ethylene oxide and another alkylene oxide, preferably propylene oxide, simultaneously and/or sequentially in any order with an initiator such as water, a polyol, a hydroxylamine, a polyamine and the like having from 2 to 6 active hydrogen atoms, like ethylene glycol, diethylene glycol, propylene glycol, ethanolamine, diethanolamine, triethanolamine, ethylene diamine, glycerol, trimethylol propane and pentaerythritol.

Alternatively, the polyol composition may comprise a mixture of two or more polyoxyalkylene polyols such that the total composition has the average functionality, equivalent weight and oxyethylene content mentioned before. The polyoxyalkylene polyols present in such mixtures are preferably poly(oxyethylene-oxypropylene) polyols but one or more polyoxyethylene polyols and/or polyoxypropylene polyols may also be present.

Preferred polyol compositions comprise :

(a) from 85 to 1009 by weight of a polyoxyalkylene polyol containing oxyethylene residues, said polyol component having an average nominal hydroxyl functionality of from 2 to 6, a number average hydroxyl equivalent weight of from 1000 to 3000 and an average oxyethylene content of from 50 to 85% by weight, and (b) from 15 to 0% by weight of one or more other polyols; the composition having an average nominal hydroxyl functionality of from 2 to 6, a number average hydroxyl equivalent weight of from 1000 to 3000 and an average oxyethylene content of from 50 to 85% by weight.

Polyol (b) suitably has an average nominal hydroxyl functionality of from 2 to 6, an average equivalent weight of 1000 to 3000 and may be, for example, a polyoxypropylene polyol, a polyoxyethylene polyol or a poly(oxyethylene-cxypropylene) polyol containing less than 50 or more than 85% by weight of oxyethylene residues.

Most preferably each polyol (b) has an oxyethylene content of at least 50% by weight. The polyoxyalkylene polyols present in such mixtures are preferably poly(oxyethylene-oxypropylene) polyols but one or more polyoxyethylene polyols may also be present.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation. It is preferred that the average nominal hydroxyl functionality of the polyol composition is from 2.5 to 4, the most preferred polyoxyalkylene polyols being triols.

If desired, the polyol composition may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in the polyoxyalkylene polyol.

Water is used as the foaming agent in the method of the invention, optionally in conjunction with a physical blowing agent, for example a low boiling organo fluoro compound. The amount of water may be varied in known manner in order to achieve the desired foam density, suitable amounts of water being, for example, from 0.25 to 20% and preferably 2 to 15% by weight based on the weight of polyol composition. Preferably water is the only foaming agent. The isocyanate index of the reaction system, taking account of the polyol composition, water and any other isocyanate-reactive species, for example chain extenders or cross-linking agents, present during the foaming reaction, may be as low as 10 or as high as 120 and preferably is 40 to 110. The flexible foams may have a free rise density of 15–100 and preferaby 20–80 kg/m$^3$.

The foam-forming reaction mixture may contain one or more of the additives used for making flexible foams. Such additives include surface-active agents and foam stabilisers, for example siloxane-oxyalkylene copolymers, chain extenders, for example low molecular weight diols or diamines, cross-linking agents, flame retardants, antioxidants, organic and inorganic fillers, pigments,agents for suppressing the so-called boiling-foam effect like polydimethylsiloxanes and internal mould release agents.

Accordingly, in a further aspect, the invention is concerned with a reaction system comprising:

(i) a polyisocyanate containing at least 85% by weight of 4,4'-diphenylmethane diisocyanate or a liquid variant thereof;

(ii) a polyol composition comprising at least one polyoxyalkylene polyol containing oxyethylene residues, said polyol composition having an average nominal hydroxyl functionality of from 2 to 6, a number average hydroxyl equivalent weight of from 1000 to 3000 and an average oxyethylene content of from 50 to 85% by weight, preferably the oxyethylene content of each polyol having a number average equivalent weight of 1000–3000 present in the polyol composition being at least 50% by weight;

(iii) water;

(iv) a catalytically effective amount of an alkali metal or alkaline earth metal carboxylate salt; and optionally (v) one or more additives used for making flexible foams. This reaction system is used for making flexible foams. The term "reaction system" is defined as a system wherein the polyisocyanate is kept in a container separate from the isocyanate-reactive ingredients.

In operating the method of the invention, the known one-shot semi-prepolymer and full prepolymer techniques may be used together with conventional mixing equipment and the foams may be produced in the form of slabstock, mouldings and the like. The preparation of such prepolymers is generally known in the art. Foams made by the method of the invention have valuable energy-absorbing properties making them useful for acoustic vibration damping as well as for seating purposes. The foams exhibit improved dynamic fatigue, compression set and hysteresis loss and have improved inherent fire properties (without adding fire retardants) at low densities.

It has now been found that the problems associated with the catalysts disclosed in EP-A 294.161 can be avoided by using the compounds of the present invention hereinafter defined.

Further this invention is concerned with an alkali metal or alkaline earth metal salt of an acid of the formula:

$$-HO-(PO)_x-\overset{O}{\underset{\|}{C}}-A-\overset{O}{\underset{\|}{C}}-OH-$$

wherein PO is an oxypropylene group, x=2–10 and A is a divalent hydrocarbon radical.

In EP-A 294.161 alkali metal or alkaline earth metal salts acids having the general formula R-A-COOH are disclosed. A preferred class of compounds are those in which R=R'OCO. Such compounds are made by the reaction of an alcohol with an acid anhydride. A particularly preferred alcohol is e.g. polyethylene glycol having a molecular weight below 500. The compounds disclosed are used as catalyst in the preparation of semi-rigid polyurethane foams. Potassium salts of the reaction product of polyethylene glycol having molecular weight 200 with maleic anhydride or itaconic anhydride are exemplified.

However, these catalysts have several drawbacks. Resin blends containing these catalysts have a limited storage stability. Furthermore, these products may contain impurities, e.g. the dipotassium salt of the employed dicarboxylic acid.

EP-A 220.697 describes alkali-metal or alkaline earth metal salts of Brönsted acids of pKa of greater than 1. One type of such compounds are alkali metal or alkaline earth metal salts of reaction products of cyclic anhydrides of dicarboxylic acids and a base polyol. Preferred alkali metals are sodium or potassium, preferred base polyols are polyalkylene oxide glycols or triols, and succinic or maleic anhydride are the preferred cyclic anhydrides. The compounds are used as foam modifiers in the production of water-blown flexible polyurethane foams.

GB-A 2.064.567 discloses anhydrous reaction products of a polyether polyol and a dibasic carboxylic acid anhydride, said polyether polyol being partially in the form of an alkali metal or alkaline earth metal alcoholate. Said reaction products are used in the production of rigid polyisocyanurate foams where they can function simultaneously as polyol component and trimerisation catalyst, thus overcoming the problem of the use of a carboxylate having only limited solubility in the polyols normally used in the polyisocyanurate formulations.

Half-esters of a cyclic dicarboxylic acid anhydride and a polyethylene glycol or polypropylene glycol of molecular weigth of from about 200 to about 1500 are described in U.S. Pat. No. 4.797.464. But this half-ester is further reacted with a polyepoxide to form a liquid polyester oligomer; a metal salt is not prepared from the half-esters.

Alkali metal salts of a partial ester of an alkyl group-substituted polyether and a long chain aliphatic hydrocarbon group-substituted succinic acid are used as additives in gasoline compositions in EP-A 491.439.

In JP-A 50.139.791 alkali metal salts of dicarboxylic acid monoesters derived from polypropylene oxide adducts having a molecular weight of more than 500 are used in water-soluble plastic working oils for metal, and JP-A 62.085.076 discloses the use of esters derived from ethylene oxide/propylene oxide block or random copolymers and polyvalent carboxylic acids in which at least one COOH-group is an alkali metal salt, in processing compositions for thermoplastic synthetic fibres.

The salts according to the present invention exhibit a prolonged storage stability in admixture with polyols and do not contain undesirable impurities.

The alkali metal or alkaline earth metal may be any metal of Group IA and IIA of the Periodic Table like lithium, sodium, potassium, calcium, barium and strontium. In general, the alkali metals, that is to say the Group IA metals like potassium and sodium are preferred, especially potassium. If desired mixtures of metal salts, e.g. potassium and sodium salts, may be used.

A is a divalent hydrocarbon radical having generally 1-6, preferably 1-3 carbon atoms. It may be selected from divalent radicals like —$CH_2$—, —$CH_2CH_2$—, —$CH_2CH_2CH_2$—, $$-CH=CH-CH_2, -CH_2-\underset{|}{CH}-CH_3,$$

$$-CH=CH-, -CH=\underset{|}{C}-CH_3, CH_2=\underset{|}{C}-CH_2-,$$

$-(C_6H_{10})-$ and $-(C_6H_8)-$.

Preferably A is a radical of the formula —CH=CH— or $$-CH_2-\underset{\underset{CH_2}{\|}}{C}-$$

The number of oxypropylene groups (X) is preferably 3–7. The salts are prepared by (a) reacting a polyoxypropylene glycol of the formula $$-HO-(PO)_x-H \qquad (2)$$

with an acid anhydride of the formula

(3)

to form an acid of the formula (1), and (b) reacting said acid with an inorganic alkali metal or alkaline earth metal salt; x and A having the same meaning as above. Suitable acid anhydrides of formula (3) which may be used include succinic, glutaric, maleic, phthalic and itaconic anhydrides, and the anhydrides of 1,2-cyclohexane and 1,2-cyclohexene dicarboxylic acids. Maleic and itaconic anhydride are preferred.

In step (a), the acid forming step, reaction takes place of the anhydride with the secondary hydroxyl groups of the polyoxypropylene glycol. This reaction may be accelerated by addition of an appropriate catalyst. Potassium salts, e.g. potassium octoate, are suitable catalysts. Reaction of (2) and (3) takes place under atmospheric pressure at 20°–100° C., preferably at 50°–80° C. for 0.5–24 hours optionally in the presence of a catalyst.

Any inorganic salt of an alkali metal or alkaline earth metal may be used in step (b), the neutralisation step. Carbonates, however, are preferred since they lead to the formation of water and $CO_2$ as by-products when reacted with compounds according to formula (1). Reaction conditions for step (b) are : atmospheric pressure at 20°–70° C., preferably 30°–50° C. for 0.5–5 preferably 1–4 hours.

The presence of water in the reaction system during step (a) may cause hydrolysis of the acid anhydride with formation of the corresponding dicarboxylic acid. Also in step (b) dicarboxylic acid may be formed due to the hydrolysis of the polyoxypropylene monoester of formula (1) in polyoxypropylene glycol and a di-acid. These acids can be converted in step (b) to their alkali or alkaline earth metal salts which is undesirable. If e.g. maleic acid is present and a potassium salt is added, potassium maleate can be formed, which is not soluble in the reaction mixture and crystallises. Consequently the product has a cloudy appearance.

In order to make the reaction in step (b) less mixing dependent, the inorganic salt is advantageously added as an aqueous solution. However, as already mentioned, water may cause the formation of undesirable by-products. Therefore, care should be taken to conduct reaction step (b) at a temperature of not more than 50° C. : it was found that the addition of considerable amounts of water (up to 12% by weight) gives no hydrolysis below that temperature. An additional advantage of working at such moderate temperature is that froth can be controlled in case $CO_2$-producing inorganic salts (e.g carbonates) are being used.

Addition of not more than 100 mole % of inorganic salt on the acid anhydride will result in a clear end-product. An overcharge of the alkali metal or alkaline earth metal salt on the other hand results in a cloudy product, but the catalytic activity remains unaffected.

It is preferred to add a slight undercharge (99–100 mole %) of inorganic alkali metal or alkaline earth metal salt in step (b).

Generally, the water-content of the product obtained is step (b) is more than 10% by weight.

In order to have optimal shelf life of the catalyst in a polyol the water content of the product obtained in step (b) should be less than 5% by weight.

Preferably step (b) is therefore followed by an additional drying step (c), in which excess water is removed by distillation under vacuum (less than 100, preferably less than 50 mm Hg) until the desired water content of less than 5% by weight is achieved. After addition of an amount of polyol to the so obtained product a clear and storage stable catalyst blend is obtained. The amount of polyol used is at least 0.8 times the weight of the product obtained after drying. In case the amount of polyol is at least 3 times the amount of the product obtained after step (b), drying step (c) does not need to take place.

The salts according to the present invention are particularly useful as catalysts in the production of semi-rigid and flexible polyurethane foams.

A catalytically effective amount of the salt will usually be in the range from 1 to 20 milliequivalents, preferably from 2 to 10 milliequivalents based on 100 grams of polymeric polyols.

Organic polyisocyanates which may be employed in preparing the semi-rigid polyurethane foam include aromatic diisocyanates, especially those which are commercially available such as tolylene and diphenylmethane diisocyanates. Since liquid polyisocyanates are preferred it is convenient to use MDI isomer mixtures or MDI variants containing urethane, allophanate, urea, biuret, carbodiimide or uretonime residues. Also useful are polymethylene polyphenylene polyisocyanates commonly known as "crude" or "polymeric" MDI. Suitable forms of urethane modified MDI include polyester or polyether based prepolymers.

Polymeric polyols which may be used in preparing the semi-rigid foam include the polyether and polyester polyols conventionally employed in the manufacture of flexible foams. Particular mention may be made of polyoxypropylene and poly(oxypropylene-oxyethylene) diols and triols having molecular weight of from 1500 to 8000, especially ethylene oxide capped polyoxypropylene diols and triols. If desired, polymer polyols formed by the polymerisation of one or more olefinic monomers in a polyether or polyester polyol may be used.

Crosslinking agents which may be used include nonpolmenric polyols having three or more hydroxyl groups and their lower molecular weight oxyalkylation products. A preferred crosslinking agent is trimethylolpropane. Chain extenders include diols such as ethylene glycol in 1,4-butanediol. The degree of flexibility/rigidity in the foamed product can be varied in known manner by varying the proportion of crosslinking agent or chain extender to polymeric polyol. In general, the crosslinking agent or chain extender should provide from about 10 to 75%, especially from about 25 to 75% of the hydroxyl groups in the foam forming reaction mixtures. The crosslinking agents and chain extenders have hydroxyl numbers of at least 250, preferably at least 300.

The water used as blowing agent is suitably present in the foam forming reaction mixture in amounts of from 0.1 to 4.5% by weight, especially from 1.5 to 3.5% by weight, based on the weight of polymeric polyol. Other blowing agents such as trichlorofluoromethane may be included, if desired, to provide additional foaming.

The amount of polyisocyanate used relative to the polyols and water is usually such as to provide an isocyanate index in the range 80 to 130, especially 90 to 110, an index of about 100 being preferred.

The foam-forming reaction mixture may also contain other conventional ingredients of polyurethane foam formulations, for example surface active agents which may be of either the silicone or the non-silicone type. Tertiary amine catalysts may also be included but are preferably excluded if staining of adjacent polymeric materials is to be avoided. If, however, tertiary amine catalysts are to be included, then those compounds are preferred that have a functional group that is reactive with isocyanates (e.g. hydroxy or primary or secondary amine) . Other useful additives include cell openers.

In practising the invention, it is usually convenient to incorporate the catalytic salt in the polyol component prior to reaction with the polyisocyanate.

Accordingly, the invention also provides a polyol component comprising (i) a polymeric polyol having a hydroxyl number in the range from 20 to 80 mg KOH/g;

(ii) water, and (iii) a catalytically effective amount of an alkali metal or alkaline earth metal salt of an acid of formula (1).

Preferably, the polyol component also comprises a crosslinking agent or chain extender having a hydroxyl number of at least 250 mg KOH/g.

Furthermore, the invention provides a reaction system for use in preparing semi-rigid polyurethane foams comprising (A) an organic polyisocyanate, and (B) a polyol component comprising:
- (i) a polymeric polyol having a hydroxyl number in the range from 20 to 80 mg KOH/g;
- (ii) water, and
- (iii) a catalytically effective amount of an alkali metal or alkaline earth metal salt of an acid of formula (1).

Such semi-rigid polyurethane foams are particularly useful in the preparation of composite articles which comprises a body of said foam in contact with a layer or sheet of a polymeric material.

Thus, in a further aspect of the invention, there is provided a composite article comprising a body of semi-rigid polyurethane foam in contact with a layer or sheet of polymeric material, the foam having been prepared by reacting an organic polyisocyanate with a polymeric polyol having a hydroxyl number in the range from 20 to 80 in the presence of water and a catalytically effective amount of an alkali metal or alkaline earth metal salt of an acid of the formula (1).

Preferably, the foam forming mixture further includes a crosslinking agent or chain extender having a hydroxyl number of at least 250 mg KOH/g. The composite articles of the invention may be prepared by bonding a pre-formed semi-rigid polyurethane foam to the polymeric material but, in general, it is preferred to form the foam in contact with the polymeric material.

The polymeric material which is in contact with the foam in the composite articles of the invention may be, for example, a decorative and/or protective facing material. As examples of such materials, there may be mentioned textile materials, paper and plastics materials, for example polyvinyl chloride which may contain plasticisers.

The invention is illustrated by the following examples in which all parts, percentages and ratios are by weight unless otherwise indicated.

EXAMPLE 1

A 1.5 L four necked reaction flask, equipped with a stirrer, thermometer, a dropping funnel and a distillation set up was charged with 366 gram polypropylene glycol (MW=210) and heated to 60°C.–65° C. Whilst stirring 9 gram of a solution of 52 wt % potassium octoate in polypropylene glycol (MW=600) was added, followed by 85 gram of maleic anhy portion-wise over a period of 30 minutes. As indicated by acid titration on the reaction was completed after 2.0 hours of reaction. Then 68 gram of cold water was added and the temperature was established at 50° C. Subsequently, 115 gram of a 50 wt % of potassium carbonate in water was added dropwise. After completion of the neutralisation reaction, the acid value of the reaction product amounted to 3.5 mg KOH/g. Then 97 gram of dipropylene glycol was added and water was removed under vacuum at a temperature of 70° C. The distillation was continued till the water content amounted to 4.5 wt %. Subsequently the product was cooled to 40° C. and 600 gram of a polyether triol (OH$_v$=28, fn=2.2; EO content 16%) was added. The product was clear and had a slightly yellowish appearance. The hydroxyl value and acid content of the product amounted to 210 mg KOH/g and 2.5 mg KOH/g, respectively.

EXAMPLE 2 (comparative)

A 1.5 L four necked reaction flask, equipped with a stirrer, thermomether, a dropping funnel and a distillation set up was charged with 259 gram polyethylene glycol (MW=200) and heated to 60°–650° C. Whilst stirring 127 gram of maleic anhydride was added portion-wise over a period of 30 minutes. As indicated by acid titration, the reaction was completed after 8 hours of reaction. After 10 hours of reaction 218 gram of ethylene glycol is added. Subsequently the temperature is established at 50° C. and 177.5 gram of a 50/50 weight solution of potassium carbonate in water is added dropwise. After the reaction had been completed, the acid value of the reaction product amounted to 3 mg KOH/g. Then 218 gram of dipropylene glycol was added and water was removed under vacuum at a temperature of 100° C. The acid value and hydroxyl number of the product amounted to 4.5 mg KOH/g and 770 mg KOH/g respectively. The product was clear and had a slightly yellowish appearance and its water content amounted to 1.0 wt %. The thus produced catalyst is similar to catalyst A in EP-A 294,161.

EXAMPLE 3

1000 g of a fully formulated polyol blend with the following composition has been prepared in a 1.5 L cylindrical glass jar in the conventional manner:

| | |
|---|---|
| Polyol A | 60.09 |
| Polyol B | 16.10 |
| Polyol C | 7.53 |
| Polyol D | 10.07 |
| Glycerol | 0.26 |
| Water | 2.00 |
| Catalyst of example 1 | 7.92 |

Polyol A: EO/PO adduct of glycerol (MW=6000, fn=3, EO-content=16.5% (all tip))

Polyol B: DEG-initiated EO/PO diol (MW=3750, EO-content=18.5% with 15% EO-tip)

Polyol C: EO/PO adduct of acrylonitrile (hydroxyl-number=31, 14% EO-tip)

Polyol D: polypropylene glycol of MW=1000.

The blend was left for three hours. Then 70.0 g of the blend was decanted from the jar and poured into a 750 ml paper beaker. Subsequently 30.0 g of a polymeric MDI (30.7% NCO; fn=2.7) was added. The two components were mixed with a propeller blade at 2500 r.p.m. and the reactivity was measured : the cream, string and end of rise time amounted to 15, 82 and 195 seconds respectively. Of the cured foam the free rise density was determined. This amounted to 83 kg/m$^3$. The glass jar was shelved at room temperature. After seven days and fourteen days again cup foams were produced in the same manner as described for the cup foam that was produced three hours after blend preparation. Within the accuracy of the test method, the cream, string and end of rise time and the free rise density had not changed, which indicates that the fully formulated polyol blend has an excellent shelf life.

EXAMPLE 4 (comparative)

1000 g of a fully formulated polyol blend with the following composition has been prepared in a 1.5 L cylindrical glass jar as in example 3:

| | |
|---|---|
| Polyol A | 64.09 |
| Polyol B | 16.10 |
| Polyol C | 7.53 |
| Polyol D | 10.07 |
| Glycerol | 0.26 |

|  | 3 hrs | 7 days | 14 days |
| --- | --- | --- | --- |
| Water | 2.00 | | |
| Catalyst of example 2 | 3.8 | | |

The concentration of potassium in this blend has been calculated to be the same as that in example 3. To determine the reactivity of the polyol blend as a function of time, the same procedure as described in example 3 was followed. In order to work nominally at the same isocyanate index as in example 3 the weight amounts of polyol blend and the polyisocyanate were slightly different : these amounted to 68.5 g and 31.4 g for the polyol blend and polyisocyanate respectively. The reactivity of the polyol blend as determined after 3 hours, 7 and 14 days is given in the table below

|  | 3 hrs | 7 days | 14 days |
| --- | --- | --- | --- |
| cream time(s) | 15 | 36 | 44 |
| string time(s) | 92 | 180 | 200 |
| end of rise time(s) | 155 | >200 | >200 |
| free rise density (kg/m³) | 90 | 95 | 94 |

This series of measurements indicates that the shelf life of the polyol blend that contains the catalyst of comparative example 2 has a limited shelf life.

The reduction in reaction rate as the blend ages is due to phase separation of the catalyst from the blend. Since the density of the catalyst phase is higher than that of the polyol blend a layer of catalyst rich product settled on the bottom of the jar.

EXAMPLE 5

The freshly prepared fully formulated polyol blend as described in example 3 was left for three hours and then 70.0 gram of the blend was poured in a 750 ml paper beaker. Subsequently 30 gram of polymeric MDI (30.7% NCO, fn=2.7) was added. The two components were mixed with a propeller blade at 2500 rpm. A PVC/foam composite was made by placing a non-pigmented lead stabilised PVC foil (1 mm thickness) in an aluminium mould (15×10×1 cm) at 40° C. and foaming 70 gram of the above reaction mixture thereon. The composite was demoulded after 4 minutes of reaction. Of this composite 3 dogbone shaped specimen with dimensions according to DIN 5305504 S2 were cut and put into a Petri disch of approx. 10 cm diameter. They were aged in an air circulation oven at 120° C. After 100, 250 and 500 hours of ageing each time one of the samples was taken of the Petri dish. The discoloration of the PVC skin was "slight after 100 hours, "slight to moderate" after 250 hours and "moderate" after 500 hours. The terms used to qualitatively describe the discoloration have the same meaning as in EP-A 294.161.

EXAMPLE 6

A prepolymer was prepared by reacting 70 parts by weight of Polyol 1 and 30 parts by weight of Polyisocyanate 1. 100 parts of this prepolymer were mixed with 10 parts of Polyisocyanate 2. From this polyisocyanate composition a flexible foam was prepared by reacting it with a composition containing 2.15 pbw of water and 1.1 pbw of catalyst 1 at an isocyanate index of 100. The free rise density was 34 Kg/m; the compression load deflection (40w) was 1.1 kPa; the hysteresis loss was 199%; the resilience was 41% and no recession was observed.

In the above examples the densities, the resilience, the compression load deflection an the hysteresis loss were measured according to ISO 1855, ISO 8307, ISO 3386 and ISO 3386 respectively.

Polyol 1: a polyether triol having random oxyethylene and oxypropylene residues with a 77% by weight oxyethylene content and a molecular weight of about 4000. Polyisocyanate 1 pure 4,4'-MDI. Polyisocyanate 2: uretonimine-modified 4,4'-MDI having an NCO content of 29.3% by weight.

Catalyst 1: the potassium salt of the hemi-ester of maleic acid and polypropylene glycol having a molecular weight of 200 which was prepared as follows. A 3-neck round-bottomed flask fitted with stirrer, thermometer and condenser was charged with two moles of polypropylene glycol (mol. weight 200) and the temperature was raised to 700°C. One mole of maleic anhydride was added. When the reaction was completed, as indicated by acid titration, half a mole of potassium carbonate was added as a 50% aqueous solution whilst vigorously stirring. After completion of this reaction 100 gr of dipropylene glycol is added. Subsequently water was removed at 80° C. under vacuum. A typical analysis of the product is a water content of approximately 1–2% and an acid value of 4–10 mg KOH/g.

We claim:

1. A method for the preparation of flexible polyurethane foams by reacting a polyisocyanate containing at least 85% by weight of 4,4'-diphenylmethane diisocyanate or a liquid variant thereof wherein said liquid variant is selected from the group consisting of liquid products obtained by introducing uretonimine and carbodiimide groups into said polyisocyanate and liquid products obtained by reacting a polyisocyanate with one or more polyols with a polyol composition comprising at least one poly(oxyethylene-oxyalkylene) polyol having an average nominal hydroxyl functionality of from 2 to 6, a number average hydroxyl equivalent weight of from 1000 to 3000, and an average oxyethylene content of from 50 to 85% by weight and with water in the presence of a catalytically effective amount of an alkali or alkaline earth metal carboxylate salt, wherein the onion of said carboxylate salt is selected from those having the formula R—E—A—COO⁻ wherein:

A is a hydrocarbon diradical having 1–6 carbon atoms;

E is —O— or

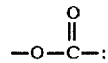

and

R is X—R₁—(OR₂)ₙ— wherein

X is —CH₃ or —OH, R₁ is a hydrocarbon diradical having 1–8 carbon atoms,

R₂ is a hydrocarbon radical having 2–4 carbon atoms and n is 2 to 10.

2. A method according to claim 1 wherein the poly (oxyethylene-oxyalkylene) polyol is a poly(oxyethylene-oxypropylene) polyol.

3. A method according to claim 1 wherein the polyol composition has an average nominal hydroxyl functionality of from 2.5 to 4.

4. A method according to claim 1 wherein the polyisocyanate contains at least 95% by weight of 4,4'-diphenylmethane diisocyanate or a liquid variant thereof wherein said liquid variant is selected from the group consisting of liquid products obtained by introducing uretonimine and carbodiimide groups into said polyisocyanate and liquid products obtained by reacting a polyisocyanate with one or more polyols.

5. A method according to claims 1–4 wherein the polyol composition comprises (a) from 85 to 100% by weight of a polyoxyalkylene polyol containing oxyethylene residues, said polyol component having an average nominal hydroxyl functionality of from 2 to 6, an average hydroxyl equivalent weight of from 1000 to 3000 and an average oxyethylene content of from 50 to 859 by weight, and (b) from 15 to 09 by weight of one or more other polyols; the composition having an average nominal hydroxyl functionality of from 2 to 6, an average hydroxyl equivalent weight of from 1000 to 3000 and an average oxyethylene content of from 50 to 85% by weight.

6. A reaction system comprising:

(i) a polyisocyanate containing at least 85% by weight of 4,4'-diphenylmethane diisocyanate or a liquid variant thereof;

(ii) a polyol composition comprising at least one poly(oxyethylene-oxyalkylene) polyol having an average nominal hydroxyl functionality of from 2 to 6, a number average hydroxyl equivalent weight of from 1000 to 3000 and an average oxyethylene content of from 50 to 85% by weight;

(iii) water;

(iv) a catalytically effective amount of an alkali metal or alkaline earth metal carboxylate salt; and optionally (v) one or more additives used for making flexible foams wherein the onion of said carboxylate salt is selected from those having the formula R—E—A—COO$^-$ wherein:

A is a hydrocarbon diradical having 1–6 carbon atoms;

E is —O— or

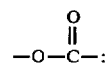

and

R is X—$R_1$—$(OR_2)_n$— wherein
X is—$CH_3$ or—OH, $R_1$ is a hydrocarbon diradical having 1–8 carbon atoms, $R_2$ is a hydrocarbon radical having 2–4 carbon atoms and n is 2 to 10.

* * * * *

UNITED STATES PATENT AND TRADEMARK OFFICE
CERTIFICATE OF CORRECTION

PATENT NO.   : 5,773,483
DATED        : June 30, 1998
INVENTOR(S)  : Eling et al.

It is certified that error appears in the above-identified patent and that said Letters Patent is hereby corrected as shown below:

Claim 1, lines 15-16 after "wherein" delete "the anion of";

Clain 5, line 7 after "from 50 to", delete "859" and insert --85%--; Claim 5, line 7, after "from 15 to", delete "09" and insert --0%--;

Claim 6, line 6, after "wherein", delete "the anion of".

Signed and Sealed this

Thirteenth Day of April, 1999

Q. TODD DICKINSON

Attest:

Attesting Officer

Acting Commissioner of Patents and Trademarks